US008192525B2

(12) United States Patent
Teixeira et al.

(10) Patent No.: US 8,192,525 B2
(45) Date of Patent: Jun. 5, 2012

(54) METHOD AND SYSTEM FOR PRODUCING CARBON MONOXIDE BY CRYOGENIC DISTILLATION

(75) Inventors: Guillaume Teixeira, Paris (FR); Jean-Marc Peyron, Creteil (FR); Jean-François Rauch, Joinville-le-Pont (FR); Natacha Haik-Beraud, Nogent-sur-Marne (FR); Jean Billy, Le Plessis-Trevise (FR)

(73) Assignee: L'Air Liquide Societe Anonyme pour l'Etude Et l'Exploration des Procedes Georges Claude, Paris (FR)

( * ) Notice: Subject to any disclaimer, the term of this patent is extended or adjusted under 35 U.S.C. 154(b) by 681 days.

(21) Appl. No.: 11/814,558

(22) PCT Filed: Jan. 23, 2006

(86) PCT No.: PCT/FR2006/050039
§ 371 (c)(1),
(2), (4) Date: Nov. 20, 2009

(87) PCT Pub. No.: WO2006/079736
PCT Pub. Date: Aug. 3, 2006

(65) Prior Publication Data
US 2010/0055021 A1    Mar. 4, 2010

(30) Foreign Application Priority Data
Jan. 25, 2005  (FR) ...................... 05 50206

(51) Int. Cl.
*B01D 53/04* (2006.01)
*F25J 3/02* (2006.01)
(52) U.S. Cl. ................ 95/90; 96/115; 62/617; 62/920
(58) Field of Classification Search ............... 95/90, 96, 95/117, 139, 263; 96/109, 115, 116, 121; 62/617, 920
See application file for complete search history.

(56) References Cited

U.S. PATENT DOCUMENTS 6,911,066 B2   6/2005  Monereau
2011/0138853 A1*  6/2011  Haik-Beraud et al. .......... 62/617

FOREIGN PATENT DOCUMENTS

| DE | 36 31 332 | 3/1988 |
| EP | 1 245 533 | 10/2002 |
| EP | 1 479 989 | 11/2004 |
| WO | WO 03 049839 | 6/2003 |

OTHER PUBLICATIONS

International Search Report for PCT/FR2006/050039, mailed May 2006.

* cited by examiner

*Primary Examiner* — Frank Lawrence, Jr.
(74) *Attorney, Agent, or Firm* — Elwood L. Haynes

(57) ABSTRACT

The invention relates to a method for producing carbon monoxide consisting, during an adsorption step, in using N adsorbers (4A, 4B), wherein N is equal to greater than two, each of which follows, at an offset; the same period T cycle during which adsorption and regeneration phases succeed each other, in exposing, at the beginning of the adsorption phase, each adsorber to an eluting phase during which only a part of a nominal flowrate of the mixture is transferred to the adsorber until said adsorber is substantially carbon monoxide saturated while at least the second adsorber is maintained in the adsorption phase and a purified gaseous mixture is partially liquefied for producing a liquefied gaseous mixture, in storing said mixture in a capacity (7) and in transferring the liquefied gaseous mixture from the capacity to at least one column (11) for the separation thereof into a carbon monoxide rich product and, during at least one part of the adsorber eluting phases, the liquid level in the container is decreased and during at lest one part of the cycle outside of the eluting periods, said level is increased.

11 Claims, 3 Drawing Sheets

METHOD AND SYSTEM FOR PRODUCING CARBON MONOXIDE BY CRYOGENIC DISTILLATION

Figure 1:
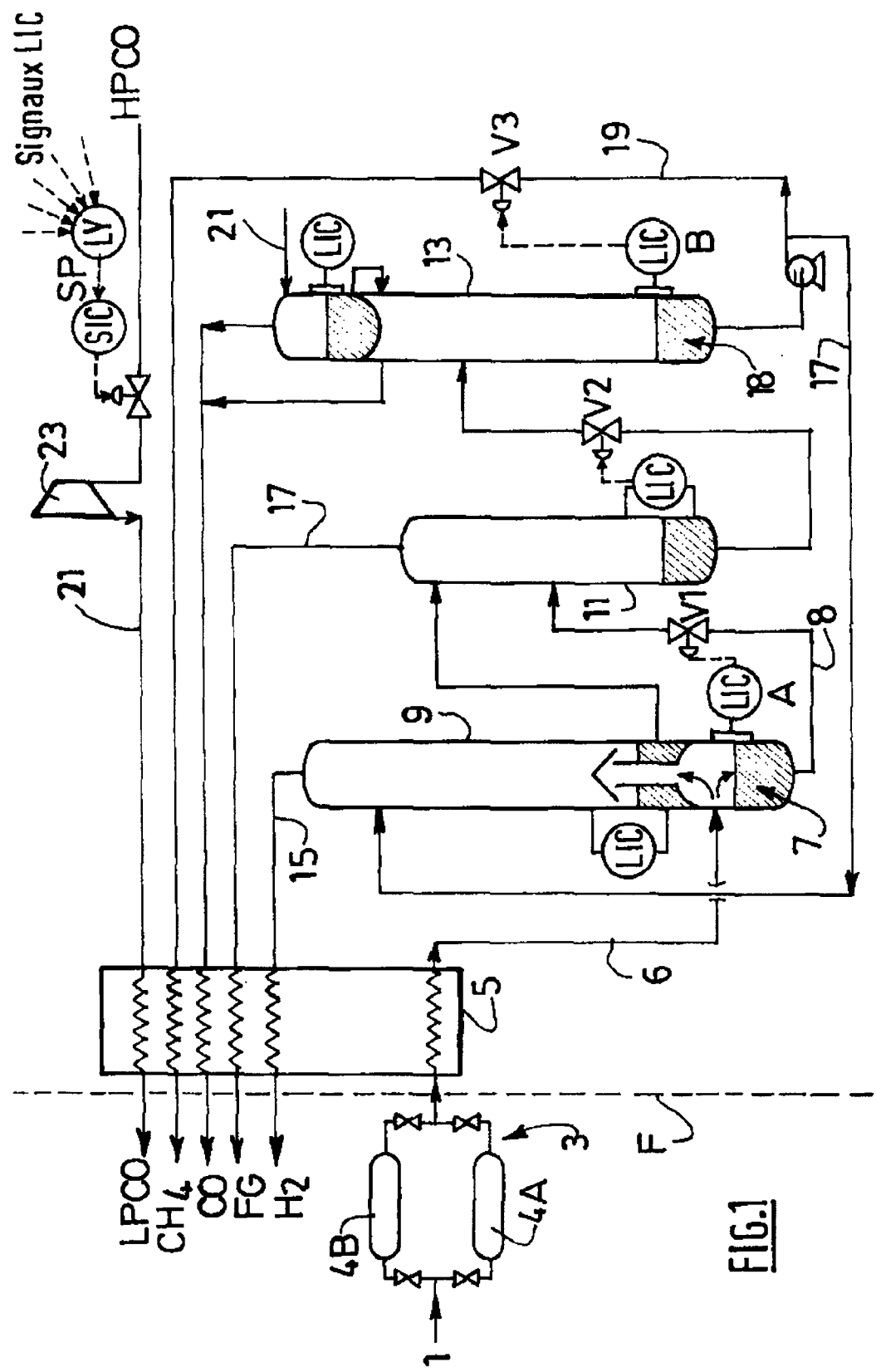

This application is a 371 of International PCT Application PCT/FR2006/050039, filed Jan. 23, 2006.

BACKGROUND

The present invention relates to a method and an installation for producing carbon monoxide by cryogenic distillation.

The gas mixture to be separated in a method for producing carbon monoxide and/or hydrogen by cryogenic distillation must be purified to remove the moisture and the traces of carbon dioxide liable to freeze at low temperatures and thereby clog the heat exchangers of the cold box.

The moisture and carbon dioxide are conventionally trapped by passing the feed gas through a desiccation unit containing various adsorbents, including molecular sieve.

In fact, the molecular sieve has the property of adsorbing significant amounts of carbon monoxide. This significantly influences the production rate at the start of each adsorption cycle, as long as the sieve is not saturated with carbon monoxide. These production fluctuations may be harmful to the downstream units.

One countermeasure described in WO 03/049839 consists in preceding each adsorption cycle by what is called an elution sequence, during which the adsorbent bed is progressively saturated with carbon monoxide, thereby somewhat smoothing the decrease observed in production. Elution phase means a phase during which one of the adsorbents receives only a small fraction of the stream to be purified, for example, between 2 and 10 mol % of the stream to be purified.

Additional countermeasures in the cold box are described in EP-A-1 479 989: for example, the use of the liquid carbon monoxide vessel as a buffer volume. The carbon monoxide accumulating outside the elution phase is thus revaporized in the heat exchange line during elution to offset the loss in the dryers. Unfortunately, tests conducted for this purpose have revealed the difficulty of implementation, which is explained by a disequilibrium of the cold balance.

The invention consists in using a buffer vessel located in the bottom of the scrubber. At this level of the cold box, the carbon monoxide is present in a fraction of liquefied synthesis gas, which accumulates outside the elution phases. When elution occurs in the dryers, the buffer vessel is emptied, thereby stabilizing the carbon monoxide production rate.

During the phase of liquefied synthesis gas accumulation in the bottom of the scrubber, the retention of liquid methane in the bottom of the carbon monoxide and methane separator is progressively reduced. On the contrary, during the elution phase, the depletion of liquefied synthesis gas is offset by an increase in the retention of liquid methane. If necessary, the level of the stripper and the flow rate of methane vaporized in the heat exchanger can also be adjusted.

The primary advantage of this invention is that it preserves the equilibrium of the cold balance, thanks to the overall maintenance of the cryogenic liquid inventories through the cold box. The carbon monoxide turbine can be regulated to ensure the precise equilibrium of the cold balance.

The second advantage of this invention is that it serves to maintain a constant partial carbon monoxide flow rate in the flash column and the carbon monoxide and methane separator. This is beneficial for operating stability. However, it is also possible to adjust a CO vessel (the one at the top of the $CO/CH_4$ separator, for example) instead of the synthesis gas retention in the bottom of the scrubber.

It is a primary object of the invention to provide a method for producing carbon monoxide and, optionally, hydrogen by separating a gas mixture, comprising an adsorption separation step followed by a cryogenic separation step in which:

i) during the adsorption step, N adsorbers are used, with N equal to or greater than two, which each follow, in a staggered sequence, the same cycle of time T, during which an adsorption phase and a regeneration phase occur in succession, and, at the start of the adsorption phase, each adsorber is subjected to an elution phase during which only part of the nominal flow of the mixture is sent to the adsorber until it is substantially saturated with carbon monoxide, while maintaining at least one other adsorber in an adsorption phase, ii) characterized in that throughout the cycle, the purified gas mixture is partially liquefied to produce liquefied gas mixture, the said mixture is stored in a vessel and liquefied gas mixture is sent from the vessel to at least one column for separating into a carbon monoxide rich product and, during at least part of the adsorber elution phases, the liquid level in the vessel drops and, during at least part of the cycle outside the elution phases, this level rises.

According to further optional aspects of the invention:
- the vessel is the bottom part of a cryogenic separation column;
- the level of the liquefied gas mixture in the vessel rises throughout the cycle outside the elution phase and/or the level of the liquefied gas mixture in the vessel drops only during the elution phases;
- the gas mixture contains at least carbon monoxide, hydrogen and methane, part of the purified gas mixture is sent to a methane scrubber, a hydrogen enriched gas is tapped off at the top of the methane scrubber, a carbon monoxide enriched liquid is sent from the methane scrubber to the top of a stripper, a carbon monoxide rich liquid is tapped off at the bottom of the stripper and sent to a carbon monoxide and methane separator, a methane-rich liquid is tapped off at the bottom of the carbon monoxide and methane separator and sent at least partly to the top of the methane scrubber, and a carbon monoxide rich gas stream is tapped off at the top of the carbon monoxide and methane separator;
- gas mixture is sent from the vessel to the stripper;
- the volume of methane-rich liquid in the bottom of the carbon monoxide and methane separator decreases during at least part of the cycle outside the elution phases, and this volume increases during at least part of the elution phases;
- the volume of carbon monoxide rich liquid in the bottom of the stripper decreases during at least part of the cycle outside the elution phases and/or this volume increases during at least part of the elution phases.

It is a second object of the invention to provide an installation for producing carbon monoxide and/or hydrogen by separating a gas mixture, comprising an adsorption unit and a cryogenic separation unit in which:

i) the adsorption unit comprises N adsorbers, with N equal to or greater than two, and means for sending the gas mixture to the adsorbers and means for sending the purified gas mixture from the adsorbers to the cryogenic separation unit and ii) the cryogenic separation unit comprises a cold box and, therein, a methane scrubber, a stripper, a carbon monoxide and methane separator, and a liquefied gas mixture vessel and means for controlling the liquid level in the vessel as a function of the adsorption cycle.

According to further aspects of the invention:
the liquefied gas mixture vessel communicates with the bottom of the methane scrubber and the stripper;
the liquefied gas mixture vessel is built into the methane scrubber.

According to a third aspect, an installation is provided for producing carbon monoxide and/or hydrogen by separating a gas mixture comprising an adsorption unit and a cryogenic separation unit in which:

i) the adsorption unit comprises N adsorbers, with N equal to or greater than two, and means for sending the gas mixture to the adsorbers and means for sending the purified gas mixture from the adsorbers to the cryogenic separation unit and ii) the cryogenic separation unit comprises a cold box and, therein, a phase separator constituting a liquefied gas mixture vessel and at least one stripper, means for tapping off a carbon monoxide rich fluid from one of the strippers and means for controlling the liquid level in the vessel as a function of the adsorption cycle.

Figure 2:
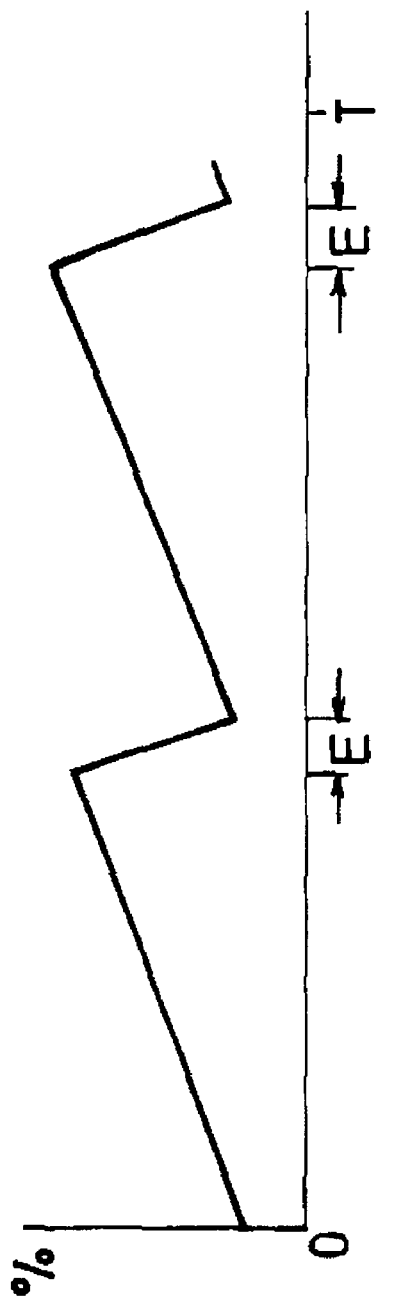
Figure 3:
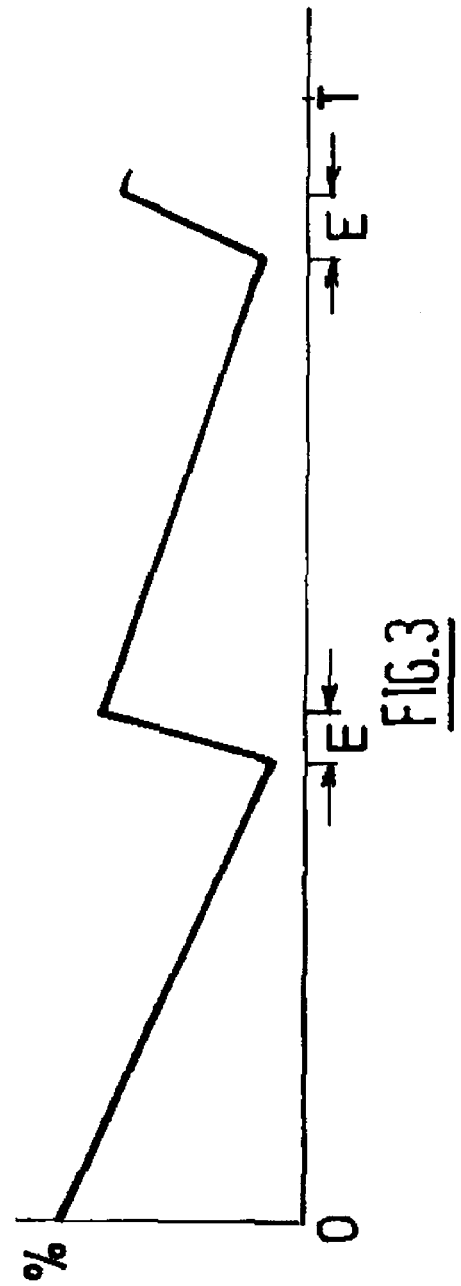
Figure 4:
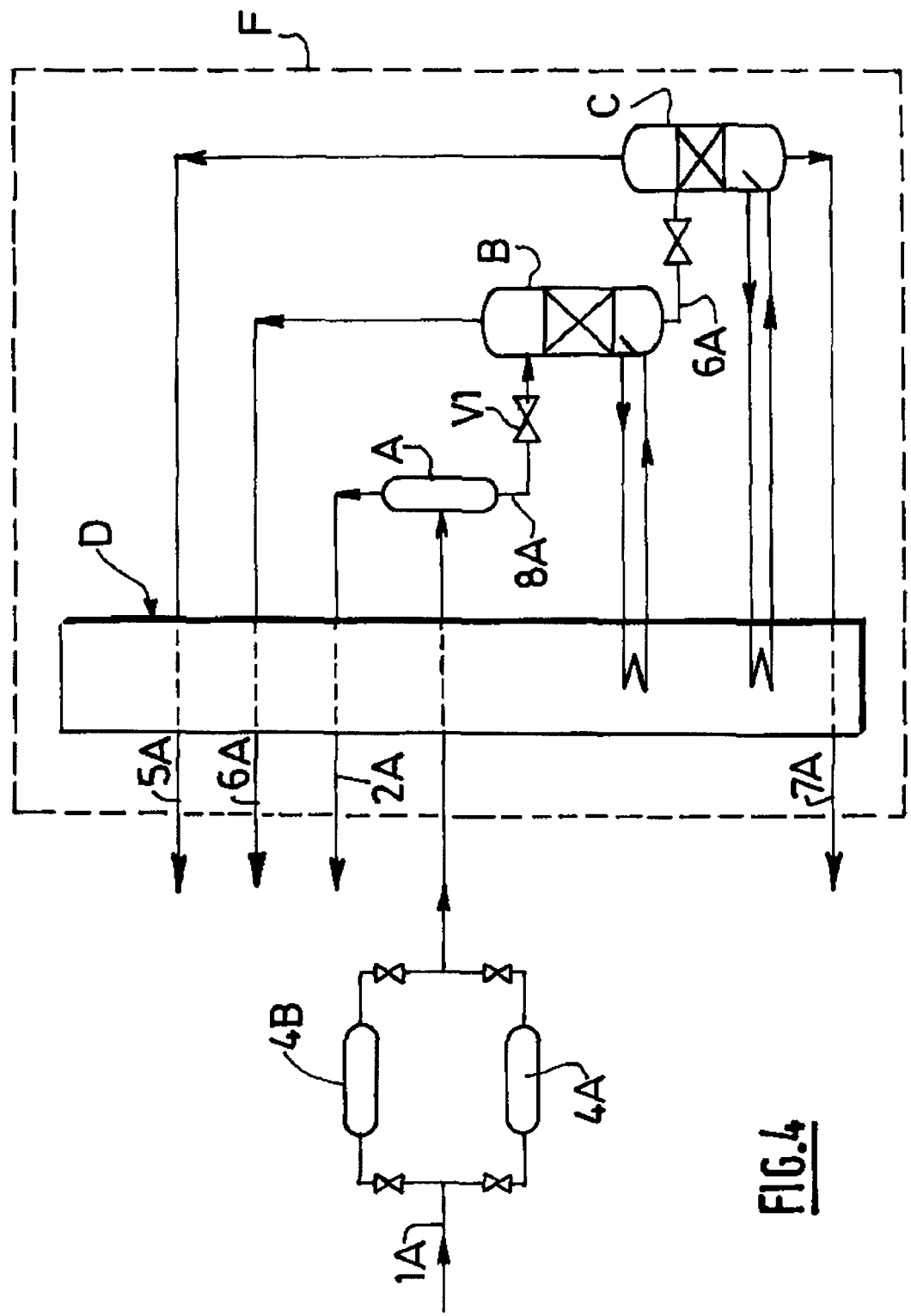

The invention is described in greater detail with reference to the figures appended hereto, in which FIG. 1 shows a first carbon monoxide and hydrogen production unit according to the invention, FIGS. 2 and 3 show the variation in the levels in the vessel and in the bottom of the CO/CH$_4$ separator during the cycle T, and FIG. 4 shows a second carbon monoxide and hydrogen production unit according to the invention.

In FIG. 1, a stream of synthesis gas 1 is sent to a purification unit 3 to remove most of the impurities, particularly moisture and carbon dioxide. This gas mixture comprises hydrogen and carbon monoxide as the main components and, optionally, secondary components, such as nitrogen and methane, and contains moisture and carbon dioxide as impurities.

The unit 3 comprises two adsorbers 4A, 4B placed in line alternately for purifying the gas mixture by adsorption. Each adsorber comprises an adsorbent material arranged in the form of a bed. The adsorber not used for adsorption is regenerated with a gas, optionally issuing from the cryogenic distillation unit. During a first step, called the elution phase, the adsorber 4A only receives a fraction of the stream to be purified, about 5% of the stream, the remainder of the stream being sent to the adsorber 4B. When the adsorber 4A is saturated with carbon monoxide, a second step begins in which the two adsorbers 4A, 4B receive 50% of the stream to be purified. Then in a third step, the adsorber 4A is in the adsorption phase while the adsorber 4B is in the regeneration phase. During a fourth step, the adsorber 4A is at the end of the adsorption phase and the adsorber 4B passes into the elution phase, the adsorber 4A receiving 95% of the stream to be purified and the adsorber 4B receiving 5% of the stream until the adsorber 4B is saturated with carbon monoxide. In a fifth step, the two adsorbers receive 50% of the gas mixture to be purified and, in the sixth and final step, the adsorber 4B adsorbs while the adsorber 4A is regenerated.

Thus in a cycle, if there are N adsorbers, there are N elution phases, so that each adsorber is saturated with carbon monoxide before adsorbing the impurities from the whole stream to be purified.

During the elution steps, due to the retention of carbon monoxide, the flow of gas mixture sent to distillation decreases by about 1%.

The saturated gas sent to the cold box F is then cooled in a heat exchanger 5 from which it issues partially liquefied. The stream is then sent to a vessel 7 below a methane scrubber 9. The vapour from the vessel 7 reaches the bottom of the scrubber 9. The liquid in the vessel is sent throughout the cycle to a stripper at an intermediate level, the top of the stripper being supplied with the bottom liquid from the methane scrubber. A liquid level detector in the vessel controls the opening of the valve V1 conveying the liquid to the stripper 11. A hydrogen-rich gas 15 is tapped off at the top of the methane scrubber 9 and is heated in the heat exchanger 5.

The vessel 7 can be built into the scrubber 9 as shown, can be separate therefrom, or can consist of the bottom of the scrubber 9.

A methane-rich liquid is tapped off at the bottom of the stripper 11 and sent to an intermediate level of the methane and carbon monoxide separator 13. A liquid level detector in the bottom of the stripper 11 controls the opening of the valve V2 conveying the liquid to the CO/CH$_4$ separator 13.

A hydrogen-rich gas 17 is tapped off at the top of the stripper 11. This fluid, called FG, is heated in the heat exchanger 5.

The bottom liquid from the CO/CH$_4$ separator 13 is pumped and sent partly 17 to the top of the methane scrubber and partly 19 to production as methane-rich liquid via a valve V3 controlled by the level in the bottom 18 of the CO/CH$_4$ separator. The top of the CO/CH$_4$ separator is cooled using a carbon monoxide cycle 21 in a known manner. The carbon monoxide rich gas 23 is tapped off at the top of the CO/CH$_4$ separator and is heated in the heat exchanger 5.

Outside the elution phases, the purified gas flow 6 sent to the methane scrubber is constant. At least while one of the adsorbers is in the adsorption phase and the other is in the regeneration phase, the flow 8 leaving the vessel 7 is controlled so that the liquid level rises, as shown in FIG. 2. During the elution phases, the flow of purified gas mixture 6 decreases and this flow 6 is depleted of carbon monoxide compared with the flow during the rest of the cycle. More liquid 8 is tapped off, at least during part of each elution phase, preferably at the start of each elution phase, so that the liquid level in the vessel drops. This level again rises in the following step, when the flow of gas to be treated is divided equally between the adsorbers 4A and 4B, and subsequently at least while one of the adsorbers is in the adsorption phase.

In this way, sending additional liquid from the vessel during at least part of each elution phase offsets the carbon monoxide depletion of the gas mixture sent to cryogenic distillation during the elution phases.

To balance the cold balance, the liquid level in the bottom 18 of the CO/CH$_4$ separator is controlled so as to rise during the elution phases whereas it drops during the rest of the cycle, as shown in FIG. 3.

This balancing means can also be replaced or supplemented by controlling at least one of the following characteristics:
the liquid level in the stripper,
the liquid level in the methane scrubber,
the speed of the turbine 23 of the carbon monoxide cycle.
In this way, a substantially constant carbon monoxide flow rate can be produced.

The invention also applies to an apparatus for producing carbon monoxide by partial condensation. A stream of purified synthesis gas 1A from the adsorption unit 4A, 4B enters the cold box F, cools in a heat exchanger D and partially liquefies. The phases separate in a phase separator A that constitutes the vessel according to the invention. The hydrogen-rich gas 2A from the phase separator is sent to the heat exchanger D. Controlled by a valve V1, the liquid 8A from the phase separator is sent to a first stripper B where it separates into a hydrogen-rich stream 6A that is heated in the heat exchanger D. The liquid 6A is expanded and sent to a second stripper that produces a carbon monoxide rich gas 5A as overhead gas and a methane-rich liquid 7A as a bottom liquid.

A liquid level detector in the vessel A controls the opening of the valve V1 conveying the liquid 8A to the first stripper B. Outside the elution phases, the purified gas flow 1A sent to the vessel A is constant. At least while one of the adsorbers is in the adsorption phase and the other is in the regeneration phase, the flow 8A leaving the vessel 7 is controlled so that the liquid level rises, as shown in FIG. 2. During the elution phases, the flow of purified gas mixture 1A decreases and this flow 1A is depleted of carbon monoxide compared with the flow during the rest of the cycle. More liquid 8A is tapped off at least during part of each elution phase, preferably at the start of each elution phase, so that the liquid level in the vessel drops. This level again rises in the following step, when the flow of gas to be treated is divided equally between the adsorbers 4A and 4B, and subsequently at least while one of the adsorbers is in the adsorption phase.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for producing carbon monoxide and, hydrogen by separating a gas mixture, comprising an adsorption separation step followed by a cryogenic separation step in which:
    a) during the adsorption step, N adsorbers are used, with N equal to or greater than two, which each follow, in a staggered sequence, the same cycle of time T, during which an adsorption phase and a regeneration phase occur in succession, and, at the start of the adsorption phase, each adsorber is subjected to an elution phase during which only part of the nominal flow of the mixture is sent to the adsorber until it is substantially saturated with carbon monoxide, while maintaining at least one other adsorber in an adsorption phase; and
    b) characterized in that throughout the cycle, a purified gas mixture is partially liquefied to produce liquefied gas mixture, the said liquefied gas mixture is stored in a vessel and liquefied gas mixture is sent from the vessel to at least one column for separating into a carbon monoxide rich fluid and, during at least part of the adsorber elution phases, the liquid level in the vessel drops and, during at least part of the cycle outside the elution phases, this level rises.

2. The method of claim 1, in which the vessel is the bottom part of a cryogenic separation column.

3. The method of claim 1, in which the level of the liquefied gas mixture in the vessel rises throughout the cycle outside the elution phase and/or the level of the liquefied gas mixture in the vessel drops only during the elution phases.

4. The method of claim 1, in which the gas mixture contains at least carbon monoxide, hydrogen and methane, part of the purified gas mixture is sent to a methane scrubber, a hydrogen enriched gas is tapped off at the top of the methane scrubber, a carbon monoxide enriched liquid is sent from the methane scrubber to the top of a stripper, a carbon-monoxide-rich liquid is tapped off at the bottom of the stripper and sent to a carbon monoxide and methane separator, a methane-rich liquid is tapped off at the bottom of the carbon monoxide and methane separator and sent at least partly to the top of the methane scrubber, and a carbon-monoxide-rich gas stream is tapped off at the top of the carbon monoxide and methane separator.

5. The method of claim 4, in which the liquefied gas mixture is sent from the vessel to the stripper.

6. The method of claim 4, in which the volume of methane-rich liquid in the bottom of the carbon monoxide and methane separator decreases during at least part of the cycle outside the elution phases, and this volume increases during at least part of the elution phases.

7. The method of claim 4, in which the volume of carbon monoxide rich liquid in the bottom of the stripper decreases during at least part of the cycle outside the elution phases and/or this volume increases during at least part of the elution phases.

8. An installation for producing carbon monoxide and/or hydrogen by separating a gas mixture, comprising an adsorption unit and a cryogenic separation unit in which:
    a) the adsorption unit comprises N adsorbers, with N equal to or greater than two, and means for sending the gas mixture to the adsorbers and means for sending the purified gas mixture from the adsorbers to the cryogenic separation unit; and
    b) the cryogenic separation unit comprises a cold box and, therein, a methane scrubber, a stripper, a carbon monoxide and methane separator, and a liquefied gas mixture vessel and means for controlling the liquid level in the vessel as a function of an adsorption cycle.

9. The installation of claim 8, in which the liquefied gas mixture vessel communicates with the bottom of the methane scrubber and the stripper.

10. The installation of claim 9, in which the liquefied gas mixture vessel is built into the methane scrubber.

11. An installation for producing carbon monoxide and/or hydrogen by separating a gas mixture comprising an adsorption unit and a cryogenic separation unit in which:
    a) the adsorption unit comprises N adsorbers, with N equal to or greater than two, and means for sending the gas mixture to the adsorbers and means for sending the purified gas mixture from the adsorbers to the cryogenic separation unit; and
    b) the cryogenic separation unit comprises a cold box and, therein, a phase separator constituting a liquefied gas mixture vessel and at least one stripper, means for tapping off a carbon monoxide rich fluid from one of the strippers and means for controlling the liquid level in the vessel as a function of an adsorption cycle.

* * * * *